US008565686B2

(12) United States Patent
Shah et al.

(10) Patent No.: US 8,565,686 B2
(45) Date of Patent: Oct. 22, 2013

(54) POWER STATUS MULTIPATH SEARCH WINDOW SIZING FOR WIRELESS COMMUNICATIONS

(75) Inventors: Maulik K. Shah, Overland Park, KS (US); Jasinder Pal Singh, Olathe, KS (US); Siddharth Oroskar, Overland Park, KS (US); Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 284 days.

(21) Appl. No.: 13/173,179

(22) Filed: Jun. 30, 2011

(65) Prior Publication Data

US 2013/0005272 A1 Jan. 3, 2013

(51) Int. Cl.
*H04B 17/00* (2006.01)

(52) U.S. Cl.
USPC .................. 455/67.11; 455/67.13; 455/127.1; 455/181.1; 370/252

(58) Field of Classification Search
USPC ............ 455/67.11, 67.13, 127.1, 181.1, 13.3, 455/562.1, 115.1, 115.3, 127.5; 370/252, 370/338
See application file for complete search history.

(56) References Cited

U.S. PATENT DOCUMENTS 5,305,353 A 4/1994 Weerackody
5,614,514 A 3/1997 Axelsson et al.
6,366,568 B1 4/2002 Bolgiano et al.
6,370,397 B1 4/2002 Popovic et al.
6,400,780 B1 6/2002 Rashid-Farrokhi et al.
6,775,252 B1 8/2004 Bayley
7,047,050 B1 * 5/2006 Khawand et al. ............. 455/574
7,062,232 B2 6/2006 Coan et al.
7,127,252 B1 * 10/2006 Aoki et al. .................... 455/442
7,302,238 B2 11/2007 Fujil
7,551,929 B2 * 6/2009 Alizadeh-Shabdiz et al. .......................... 455/456.1
7,680,202 B2 3/2010 Chan et al.
7,826,515 B2 11/2010 Reial
7,835,754 B2 * 11/2010 Alizadeh-Shabdiz et al. .......................... 455/456.1
2002/0193146 A1 12/2002 Wallace et al.
2005/0197079 A1 9/2005 Banister et al.
2006/0017626 A1 1/2006 Kannan et al.
2006/0189308 A1 * 8/2006 Kurata et al. ............. 455/422.1
2006/0223565 A1 10/2006 Gandhi et al.
2006/0233275 A1 10/2006 Chen et al.
2007/0258420 A1 * 11/2007 Alizadeh-Shabdiz et al. ............................ 370/338
2008/0123768 A1 5/2008 Harel et al.
2008/0151969 A1 6/2008 Reial
2008/0240280 A1 * 10/2008 Li ................................ 375/267
2009/0077396 A1 * 3/2009 Tsai et al. ..................... 713/310
2009/0191832 A1 7/2009 Catreux-Erceg et al.
2009/0252138 A1 * 10/2009 Alizadeh-Shabdiz et al. ............................ 370/338
2011/0058495 A1 * 3/2011 Alizadeh-Shabdiz et al. ............................ 370/252
2012/0100872 A1 * 4/2012 Alizadeh-Shabdiz et al. .......................... 455/456.1
2012/0238311 A1 * 9/2012 Takahashi ..................... 455/522
2013/0088988 A1 * 4/2013 Deng et al. .................... 370/252

FOREIGN PATENT DOCUMENTS

EP 1251642 A1 10/2002

* cited by examiner

*Primary Examiner* — Minh D Dao

(57) ABSTRACT

A method of operating a wireless communication device is disclosed. The method includes determining signal quality for wireless communications received over each of a first antenna element and a second antenna element, and processing the signal quality and a power status of the wireless communication device to determine a first multipath search window for the first antenna element and a second multipath search window for the second antenna element.

20 Claims, 5 Drawing Sheets

201

DETERMINE SIGNAL QUALITY FOR WIRELESS COMMUNICATIONS RECEIVED OVER EACH OF A FIRST ANTENNA ELEMENT AND A SECOND ANTENNA ELEMENT

202

PROCESS THE SIGNAL QUALITY AND A POWER STATUS OF THE WIRELESS COMMUNICATION DEVICE TO DETERMINE A FIRST MULTIPATH SEARCH WINDOW FOR THE FIRST ANTENNA ELEMENT AND A SECOND MULTIPATH SEARCH WINDOW FOR THE SECOND ANTENNA ELEMENT

POWER STATUS MULTIPATH SEARCH WINDOW SIZING FOR WIRELESS COMMUNICATIONS

TECHNICAL FIELD

Aspects of the disclosure are related to the field of communications, and in particular, adjusting multipath search windows for antenna diversity wireless communications in wireless communication devices.

TECHNICAL BACKGROUND

Wireless communication devices, such as cellular phones, receive wireless access to communication services over wireless links. Wireless access nodes, such as base stations, typically provide the wireless access to the communications services. However, the wireless communications exchanged between the wireless access nodes and the wireless communication devices can experience different forms of interference. One form of interference is multipath interference. In multipath interference, wireless communications can be inadvertently propagated over different simultaneous wireless paths. These different wireless paths could be influenced by the environment that the wireless signals propagate through, such as buildings, trees, landforms, obstacles, water, or weather, among other environmental influences, which could introduce reflections, time delays, phase delays, dispersion, attenuation, or other interference due to the multiple propagation paths.

Receive diversity, also referred to as spatial diversity, can be employed to reduce the effects of multipath interference. For example, a wireless communication device can include multiple antenna elements, and place the multiple antenna elements at different spatial locations or orientations in the wireless communication device. However, processing the multiple signals received over each antenna element can increase processor loading, increase drain on batteries, or otherwise decrease the available resources of a wireless communication device.

OVERVIEW

A method of operating a wireless communication device is disclosed. The method includes determining signal quality for wireless communications received over each of a first antenna element and a second antenna element, and processing the signal quality and a power status of the wireless communication device to determine a first multipath search window for the first antenna element and a second multipath search window for the second antenna element.

A wireless communication device is also disclosed. The wireless communication device includes a first antenna element and a second antenna element each configured to receive wireless communications. The wireless communication device also includes a processing system configured to determine signal quality for the wireless communications received over each of the first antenna element and the second antenna element, and process the signal quality and a power status of the wireless communication device to determine a first multipath search window for the first antenna element and a second multipath search window for the second antenna element.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
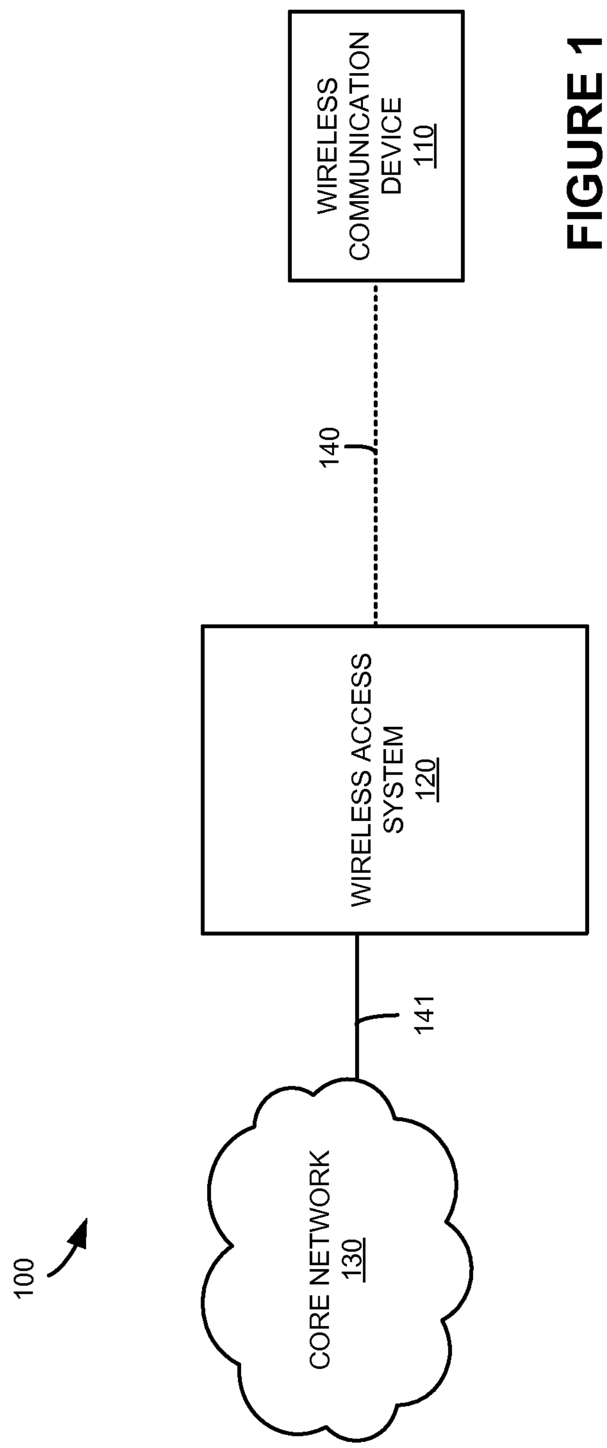
FIG. 1 is a system diagram illustrating a communication system.

FIG. 1 is a system diagram illustrating communication system 100. Communication system 100 includes wireless communication device 110, wireless access system 120, and core network 130. Wireless communication device 110 and wireless access system 120 communicate over link 140. Wireless access system 120 and core network 130 communicate over link 141. In FIG. 1, wireless access system 120 provides wireless access to communication services for wireless communication device 110 or other wireless communication devices. The communication services could include services provided by core network 130, such as phone calls, text messages, Internet access, among other communication services. In this example, wireless communication device 110 includes at least two antenna elements, possibly included in separate transceiver portions, although other configurations could be employed. The at least two antenna elements each exchange wireless communications over wireless link 140 with wireless access system 120, and allow for antenna diversity-based communications over wireless link 140. Wireless communication device 110 also includes a power system portion, such as a power supply, battery, battery charging circuitry, capacitor, or other power system element.

Figure 2:
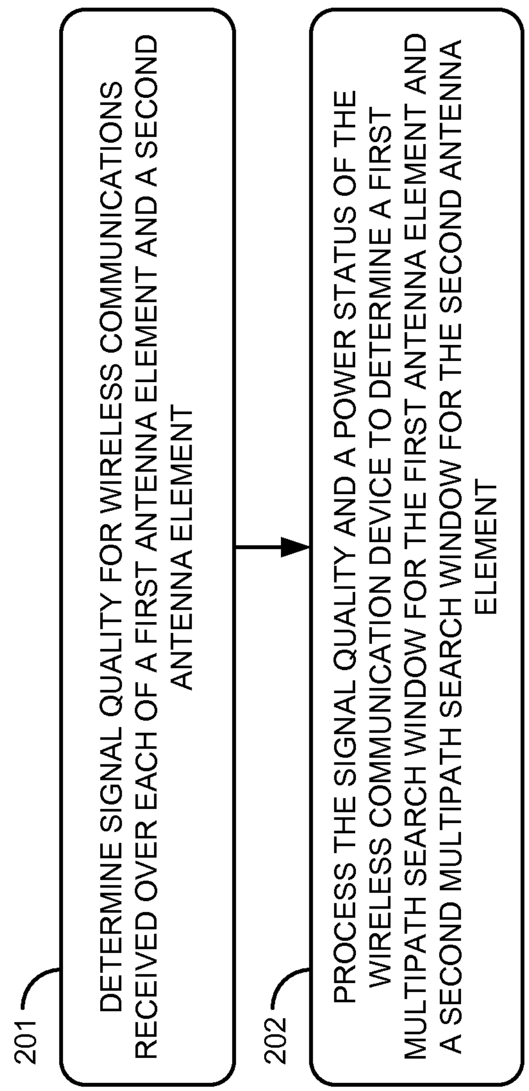
FIG. 2 is a flow diagram illustrating a method of operation of a wireless communication device.

FIG. 2 is a flow diagram illustrating a method of operation of wireless communication device 110. The operations of FIG. 2 are referenced herein parenthetically. In FIG. 2, wireless communication device 110 determines (201) signal quality for wireless communications received over each of a first antenna element and a second antenna element. The signal quality could include a signal strength, radio frequency (RF) signal level, RF signal power, bitrate, signal-to-noise ratio, or other signal quality factor of communications received over wireless link 140. The signal quality is determined for each antenna element of wireless communication device 110, and thus the signal quality could be different for each antenna element.

In this example, wireless communication device 110 employs receive diversity, placing the first antenna element and the second antenna element each at different spatial locations or orientations in wireless communication device 110. Receive diversity can reduce the effects of multipath communication interference. In multipath interference, wireless communications inadvertently propagate over different simultaneous wireless paths. These different wireless paths could be influenced by the environment the wireless signals propagate through, such as buildings, trees, landforms, obstacles, water, or weather, among other environmental influences, which could introduce reflections, time delays, phase delays, dispersion, attenuation, or other interference due to the multiple propagation paths.

Wireless communication device 110 processes (202) the signal quality and a power status of wireless communication device 110 to determine a first multipath search window for the first antenna element and a second multipath search window for the second antenna element. The power status of wireless communication device 110 can include a status of a power supply portion of wireless communication device, such as a battery status, power capacitor charge level, battery charge status, or power source status, among others. The first multipath search window includes a timeframe over which wireless communication device 110 monitors for individual signal content received by the first antenna element, and the second multipath search window includes a timeframe over which wireless communication device 110 monitors for individual signal content received by the second antenna element.

When experiencing multipath interference, wireless communication device 110 may receive multiple instances of a single transmission, which can lead to poor signal quality, misinterpreted communications, or slow transmission rates. Additionally, individual signal content could fall outside of a multipath search window as received at each antenna element due to multipath delays. However, processing the signals received at both antennas over arbitrarily large multipath search windows can increase loading on processor resources, increase power consumption by processing portions, or deplete battery charge, among other effects. In some examples, wireless communication device 110 allots a multipath search window budget between the first multipath search window and the second multipath search window based on the power status and the signal quality. Other examples could be employed, such as processing only ones of the power status or the signal quality to determine the multipath search windows. In further examples, the antenna element which has the highest signal quality has a search window increased. Likewise, an antenna element which has a lowest signal quality could have a search window decreased.

Figure 3:
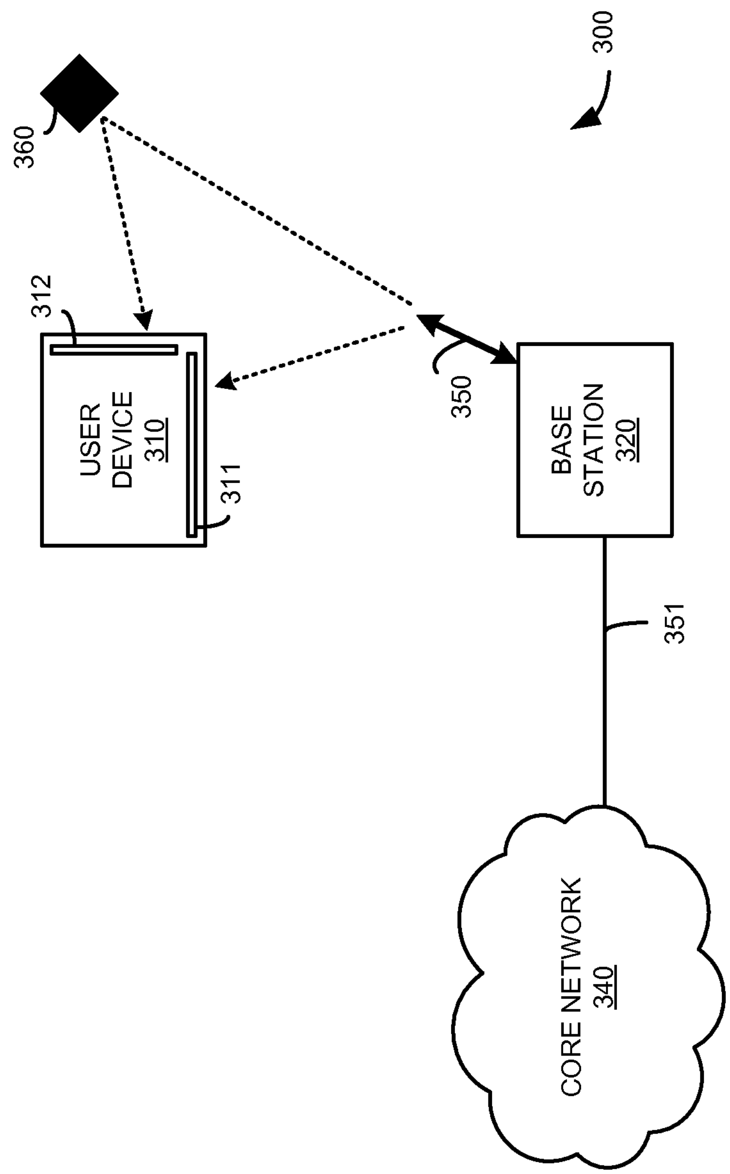
FIG. 3 is a system diagram illustrating a communication system.

FIG. 3 is a system diagram illustrating communication system 300. Communication system 300 includes user device 310, base station 320, and core network 340. Core network 340 and base station 320 communicate over link 351, which is a T1 backhaul link capable of carrying Internet protocol (IP) packets in this example. Base station 320 and user device 310 communicate over wireless link 350, which in this example is a wireless link using the Code Division Multiple Access (CDMA) wireless communication mode and protocol. Wireless link 350 is shown as taking multiple paths in FIG. 3, where the multiple paths are illustrated by the dotted lines between base station 320 and user device 310, although other representations could be used. FIG. 3 also includes obstacle 360, which is a building in this example. Obstacle 360 could instead comprise trees, rocks, terrain, vehicles, towers, sculptures, water, weather, or other obstacles. It should be understood that the elements in FIG. 3 are not shown to scale for clarity.

User device 310 comprises a mobile wireless communication device capable of voice and data communications over wireless link 350, such as a cellular smartphone. User device 310 includes first antenna element 311 and second antenna element 312, and each of first antenna element 311 and second antenna element 312 have associated receiver portions. The first and second receiver portions could include filters, amplifiers, or other transceiver circuitry and equipment, although the receiver equipment could be shared by first antenna element 311 and second antenna element 312 in some examples. Also, user device 310 includes an internal battery with an externally accessible charge port, which are not shown in FIG. 3 for clarity. In some examples, first antenna element 311 is a main antenna and second antenna element 312 is receive diversity antenna, and are configured to have low correlation between signals received at each antenna, such as having a correlation close to 0. In this example, first antenna element 311 and second antenna element 312 have an orthogonal orientation to each other, as shown in FIG. 3. It should be understood that a different configuration of antenna elements could be employed, such as parallel antenna elements, cross-linked antenna elements, or fractal configurations, among others.

Base station 320 provides wireless access over wireless link 350 to communication services for user device 310. The communication services could include voice calls, text messages, data access, or other communication services, such as communication services provided by core network 340. Base station 320 includes RF communication and control circuitry, transceivers, and antennas, as well as wireless communications equipment capable of communicating with and providing communication service to user devices using the CDMA communication mode, although other communication modes could be employed.

Core network 340 is a core network of a wireless network in this example. Core network 340 could include further base stations, routers, gateways, controller systems, processing systems, access systems, Internet systems, or other communication equipment. Core network 340 could also include equipment such as communication interfaces and processing systems for communicating with and controlling base station 320 over backhaul link 351. In this example, base station 320 is operated by the same wireless service provider as core network 340.

Figure 4:
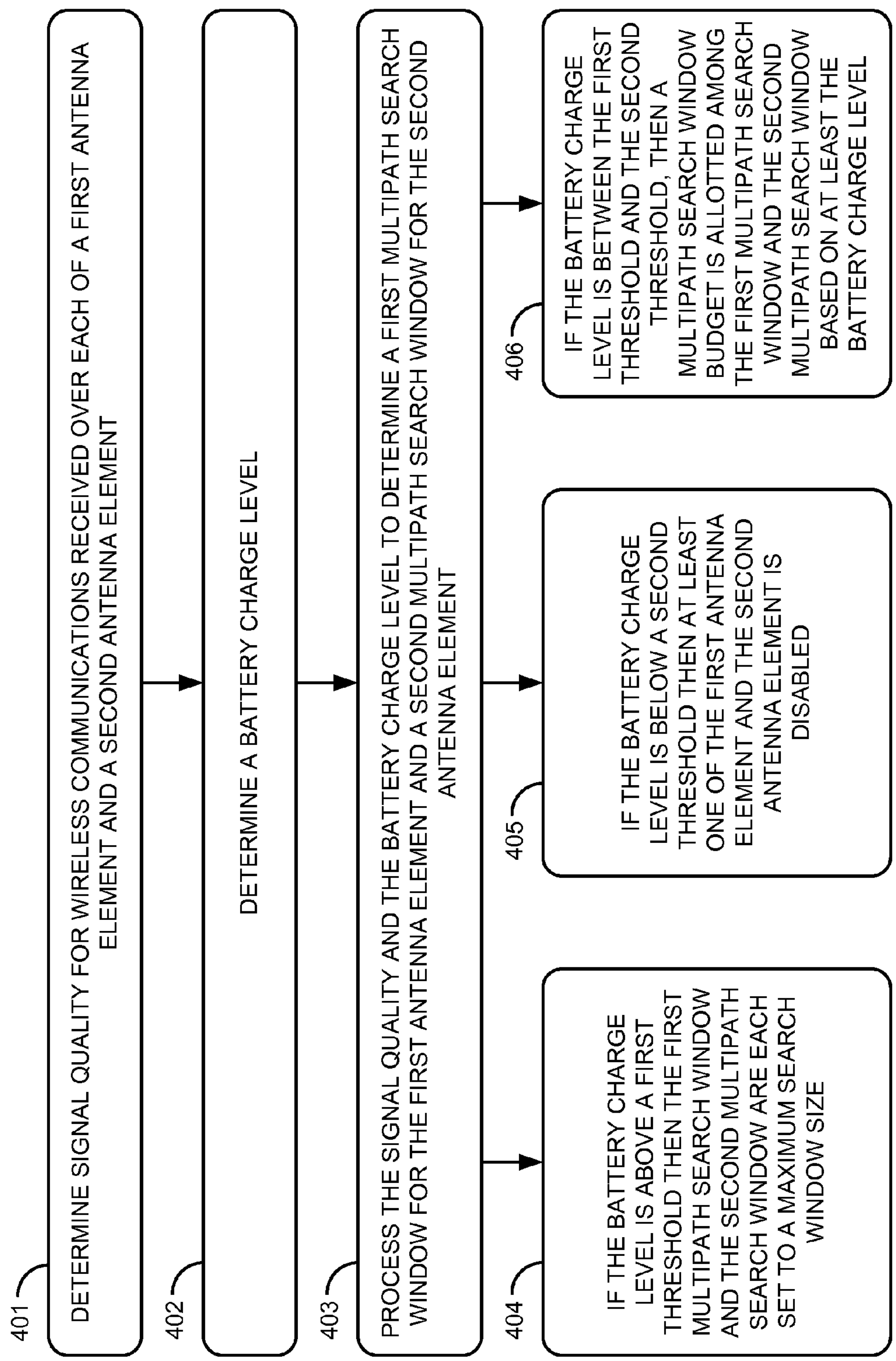
FIG. 4 is a flow diagram illustrating a method of operation of a wireless communication device.

FIG. 4 is a flow diagram illustrating a method of operation of a wireless communication device, namely user device 310. The operations of FIG. 4 are referenced herein parenthetically. In FIG. 4, user device 310 determines (401) signal quality for wireless communications received over each of first antenna element 311 and second antenna element 312. The signal quality could include a signal strength, RF signal level, RF signal power, bitrate, signal-to-noise ratio, or other signal quality factor of communications received over wireless link 350. In some examples, the signal quality is measured in decibels (dB). The signal quality is determined for communications received over first antenna element 311 and second antenna element 312, and could be determined by a receiver portion or processor associated therewith. For example, wireless communications could be received at each of first antenna element 311 and second antenna element 312 and converted from a wireless medium to a wired medium, and an associated receiver portion could receive the signals over the wired medium in an RF format to filter, amplify, or otherwise process the signals. The signal quality could be determined for the signals initially received over first antenna element 311 and second antenna element 312 at any point in the signal transport or processing pathways.

In this example, user device 310 employs receive diversity, placing first antenna element 311 and second antenna element 312 each at different spatial locations and orientations in user device 310. Receive diversity can reduce the effects of multipath communication interference. In multipath interference, wireless communications inadvertently propagate over different simultaneous wireless paths, as shown by the dotted lines propagating from wireless link 350. These different wireless paths could be influenced by the environment the wireless signals propagate through, namely obstacle 360.

Obstacle 360 introduces a reflection in one possible transmission path of wireless link 350, where a longer propagation path can create a delay in the signals transferred by base station 320 over wireless link 360. This delay can manifest as a time delay on received signals, a phase delay, or other interference, such as destructive or constructive electromagnetic interference. It should be noted that the multipath interference (such as temporal or phase delays) are distinct in this example from the signal quality as determined in operation 401 (such as an RF signal level, signal-to-noise ratio, or other signal quality metrics).

User device 310 determines (402) a battery charge level. As discussed above, user device 310 includes a battery portion and associated power system circuitry for providing power to the various elements of user device 310. The battery charge level could indicate a percentage of battery life remaining, remaining watt-hours, or other battery life metric. In some examples, the battery charge level includes whether or not user device 310 is in a charging state, such as receiving power from an external power source for recharging the battery portion or for powering user device 310 without the use of the battery portion. The external power source could include an AC wall adapter for converting external power to a form usable for charging the battery portion of user device 310 or for providing power directly to user device 310.

User device 310 processes (403) the signal quality and the battery charge level to determine a first multipath search window for first antenna element 311 and a second multipath search window for second antenna element 312. The first multipath search window indicates a timeframe over which user device 310 monitors for individual signal content received by first antenna element 311, and the second multipath search window indicates a timeframe over which user device 310 monitors for individual signal content received by second antenna element 312. When experiencing multipath interference, such as shown in FIG. 3, user device 310 may receive multiple instances of a single transmission, where individual signal content as received at each antenna element could fall outside of a search window due to multipath delays. However, processing the signals received at both antennas over arbitrarily large multipath search windows can increase loading on processor resources, increase power consumption by processing portions, or deplete battery charge, among other effects. The multipath search window sizes could be determined in a unit of time, such as milliseconds, or could be in units of wireless protocol timeslots monitored, processor memory used to buffer communications, processor cycles, or other metrics. In this example, a multiple-threshold determination is made regarding the search window sizing. It should be understood that these scenarios described in FIG. 4 could be implemented separately or differently than described. The thresholds discussed are also merely exemplary, and could vary.

If the battery charge level is above a first threshold (404), then the first multipath search window and the second multipath search window are each set to a maximum search window size. In this scenario, the first threshold represents a 'high' battery charge level, such as over 80% battery charge remaining. This scenario could also include when user device 310 is plugged into an external power source, such as when charging the battery therein. The maximum search window size could be a timeframe able to capture large multipath delays introduced by multipath interference, such as reflections from distant objects. The timeframe could have limits set by wireless protocol considerations, such as timeslot lengths, packet durations, protocol acknowledgement delays, transmission burst timeframes, among other considerations. The timeframe could be set to a longer duration than a single timeslot according to the associated wireless protocol. In this example, a CDMA protocol is employed, and the timeframe could be set to a large value as determined by the processor resources of user device 310, such as memory size, cache size, buffer size, or other signal processing resources. In yet further examples, if the battery charge level is above the first threshold, then the first multipath search window is set to a first multipath search window size, and the second multipath search window is set to a second multipath search window size. The first multipath search window size and the second multipath search window size could be of the same size in some examples.

If the battery charge level is below a second threshold (405), then at least one of first antenna element 311 and second antenna element 310 is disabled. In this scenario, the second threshold represents a 'low' battery charge level, such as less than 20% battery charge remaining. The antenna element which is disabled could be selected based on the signal quality determined for each antenna element, where the antenna element experiencing the lowest signal quality could be disabled, or the antenna element of a certain polarization is disabled. The antenna element which is disabled could be selected based on a power consumption of the antenna element or associated receiver circuitry, such as when one antenna element or associated receiver circuitry consumes more power than another. In further examples, the first antenna element is a main antenna element, and the second antenna element is a diversity antenna element, and the diversity antenna element is disabled if the battery charge level is below the second threshold. The disabled state could include where user device 310 does not process signals received over the disabled antenna element, or could include where a search window for the disabled antenna element is set to a minimum timeframe. In some examples, the antenna element or associated receiver circuitry for the disabled antenna element is powered down, or placed into a reduced power consumption state.

If the battery charge level is between the first threshold and the second threshold (406), then a multipath search window budget is allotted among the first multipath search window and the second multipath search window based on at least the battery charge level. This scenario represents a 'medium' battery charge level, such as greater than a first threshold of 20% battery charge remaining but less than a second threshold of 80% battery charge remaining. The multipath search window budget could include a lesser portion of a maximum search window timeframe to be allocated among the first antenna element and the second antenna element.

The total multipath search window budget could be determined according to the remaining battery power. In some examples, a proportional relationship, such as a linear relationship, could be determined between the battery charge level and the multipath search window budget, such that as the battery charge level decreases, the total multipath search window budget decreases, and as the battery charge level increases, the total multipath search window budget increases. In other examples, a step relationship could be determined between the battery charge level and the multipath search window budget, such that when the battery charge level is above the first threshold, then a first budget is applied, when the battery charge level is below the second threshold, then a second budget is applied, and when the battery charge level is between the first and the second threshold, then a third budget is applied.

In other examples, the multipath search window budget is allocated among first antenna element 311 and second antenna element 312 according to the signal quality experienced by each antenna element. For example, if the signal quality of first antenna element 311 is greater than the signal quality of second antenna element 312, then the first multipath search window receives a greater share of the multipath search window budget than the second multipath search window. The amount that each multipath search window is allotted from the budget could be determined according to the relative difference in each signal quality, so that the antenna element receiving the higher signal quality will receive a higher proportional share of the budget than the antenna element receiving the lower signal quality. As a further example, if antenna element 311 and antenna element 312 each have a 50% signal quality, or equal signal quality, then each associated multipath search window could be allotted at 50% of the total budget. If antenna element 311 has an 80% signal quality and antenna element 312 has a 20% signal quality, where signal qualities are relative to a total signal level between the two antenna elements, then the first multipath search window could receive 80% of the budget, and the second multipath search window could receive 20% of the budget. It should be understood that the use of a multipath search window budget could be employed without having an upper or lower battery charge level threshold, and instead be allotted according to a signal quality of each antenna over the entire range of the battery charge level.

In further examples, user device 310 processes further wireless communications received over each of first antenna portion 311 and second antenna portion 312 to determine if multipath communications related to the further wireless communications occur outside of the first multipath search window for first antenna portion 311 or outside of the second multipath search window for second antenna portion 312. User device 310 could then process the multipath communications, the signal quality, and/or the power status of user device 310 to determine a third multipath search window for first antenna portion 311 and a fourth multipath search window for second antenna portion 312. To determine if the multipath interference occurs outside of the associated multipath search windows, user device 310 could enter into a temporary maximum search window mode for each antenna element, possibly in a sequential manner to conserve simultaneous battery usage. In other examples, user device employs a third antenna element and associated receiver circuitry to determine if multipath communications occur outside of the determined multipath search windows.

Figure 5:
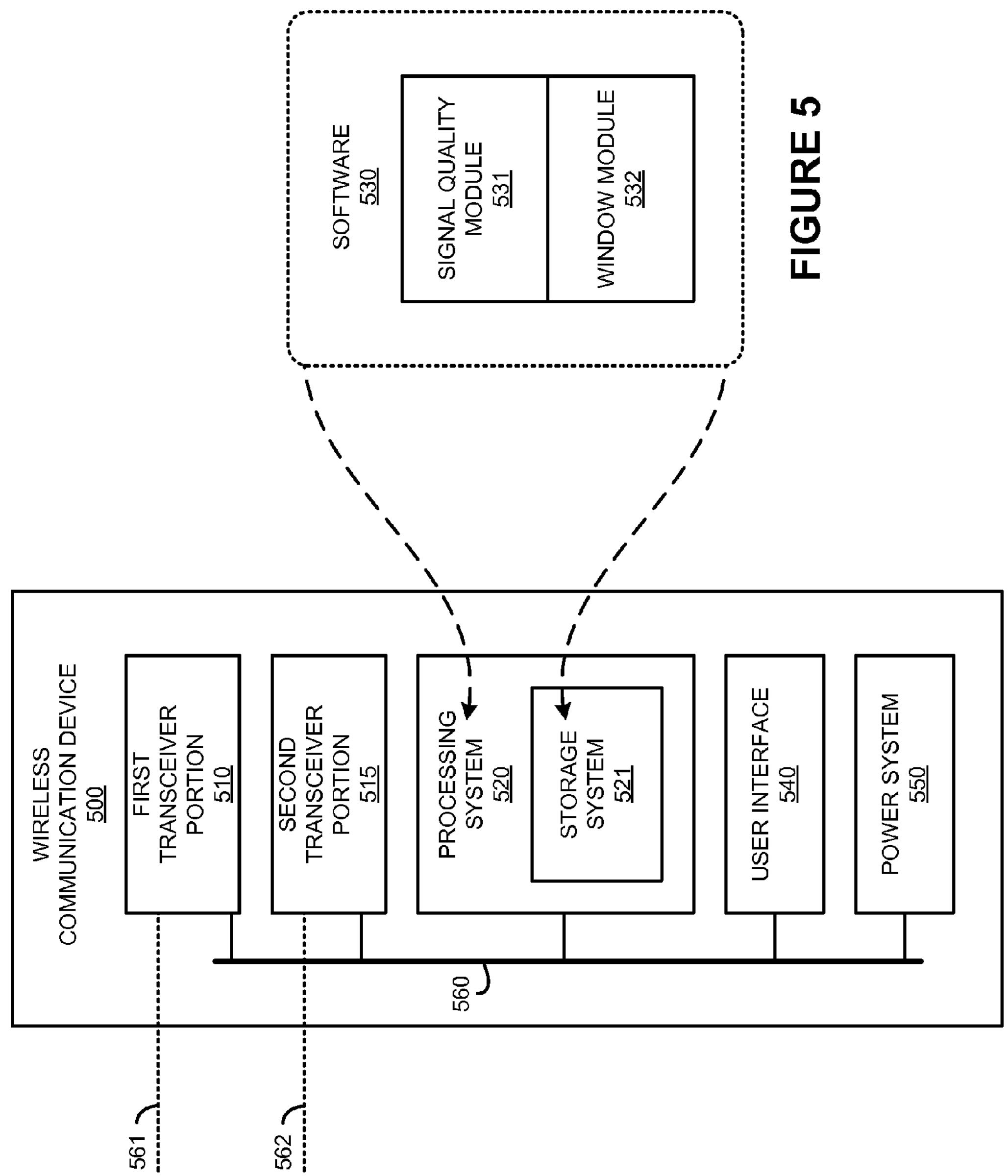
FIG. 5 is a block diagram illustrating a wireless communication device.

FIG. 5 is a block diagram illustrating wireless communication device 500, as an example of wireless communication device 110 found in FIG. 1 or user device 310 found in FIG. 3, although wireless communication device 110 or user device 310 could use other configurations. Wireless communication device 500 includes, first transceiver portion 510, second transceiver portion 515, processing system 520, user interface 540, and power system 550. First transceiver portion 510, second transceiver portion 515, processing system 520, user interface 540, and power system 550 are shown to communicate over a common bus 560 for illustrative purposes. It should be understood that discrete links could be employed, such as data links, power links, RF links, or other links. Wireless communication device 500 may be distributed or consolidated among equipment or circuitry that together forms the elements of wireless communication device 500.

First transceiver portion 510 comprises an antenna element and communication interface circuitry for communicating with wireless access nodes of a wireless communication network, such as with base stations of a cellular voice and data network. First transceiver portion 510 could include transceiver equipment and antenna elements for wirelessly exchanging user communications and overhead communications over the associated wireless link 561. First transceiver portion 510 also receives command and control information and instructions from processing system 520 or user interface 540 for controlling the operations of wireless communications over wireless link 561. Wireless link 561 could use various protocols or communication formats as described herein for wireless links 140 or 350, including combinations, variations, or improvements thereof.

Second transceiver portion 515 comprises an antenna element and communication interface circuitry for communicating with wireless access nodes of a wireless communication network, such as with base stations of a cellular voice and data network. Second transceiver portion 515 could include transceiver equipment and antenna elements for wirelessly exchanging user communications and overhead communications over the associated wireless link 562. Second transceiver portion 515 also receives command and control information and instructions from processing system 520 or user interface 540 for controlling the operations of wireless communications over wireless link 562. Wireless link 562 could use various protocols or communication formats as described herein for wireless links 140 or 350, including combinations, variations, or improvements thereof. In some examples, elements of first transceiver portion 510 and second transceiver portion 515 are included in similar circuitry.

Processing system 520 includes storage system 521. Processing system 520 retrieves and executes software 530 from storage system 521. In some examples, processing system 520 is located within the same equipment in which first transceiver portion 510, second transceiver portion 515, user interface 540, or power system 550 are located. In further examples, processing system 520 comprises specialized circuitry, and software 530 or storage system 521 could be included in the specialized circuitry to operate processing system 520 as described herein. Storage system 521 could include a non-transitory computer-readable medium such as a disk, tape, integrated circuit, server, flash memory, phase change memory, magnetic memory, optical memory, or some other memory device, and also may be distributed among multiple memory devices.

Software 530 may include an operating system, logs, utilities, drivers, networking software, tables, databases, data structures, and other software typically loaded onto a computer system. Software 530 could contain application programs, server software, firmware, or some other form of computer-readable processing instructions. When executed by processing system 520, software 530 directs processing system 520 to operate as described herein, such as determine signal levels of received communications, determine a status of power system 550, and determine multipath search windows for each of first transceiver portion 510 and second transceiver portion 515, among other operations.

In this example, software 530 includes signal quality module 531 and window module 532. It should be understood that a different configuration could be employed, and individual modules of software 530 could be included in different equipment in wireless communication device 500. Signal quality module 531 determines signal quality for wireless communications received over each of first transceiver portion 510 and second transceiver portion 515, among other operations described herein. In some examples, signal quality module 531 determines a power level status of power system 550, such as a remaining charge on a battery thereof. Window module 532 processes the signal quality and the power status of wireless communication device 500 to determine a first multipath search window for first transceiver portion 510 and a second multipath search window for second transceiver portion 515, among other operations described herein.

User interface 540 includes equipment and circuitry for receiving user input and control, such as for engaging in voice calls or data sessions, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 540 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Power system 550 includes circuitry and a power source to provide power to the elements of wireless communication device 500. The power source could include a battery, solar cell, spring, flywheel, capacitor, thermoelectric generator, chemical power source, dynamo, or other power source. In some examples, power system 550 receives power from an external source, such as a wall outlet. Power system 550 also includes circuitry to condition, monitor, and distribute electrical power to the elements of wireless communication device 500.

Bus 560 comprises a physical, logical, or virtual communication link, capable of communicating data, control signals, and communications, along with other information. In this example, bus 560 also includes RF and power distribution elements, such as wires, circuit board traces, or other elements. In some examples, bus 560 is encapsulated within the elements of first transceiver portion 510, second transceiver portion 515, processing system 520, user interface 540, or power system 550, and may be a software or logical link. In other examples, bus 560 uses various communication media, such as air, space, metal, optical fiber, or some other signal propagation path, including combinations thereof. Bus 560 could be a direct link or might include various equipment, intermediate components, systems, and networks.

Referring back to FIG. 1, wireless communication device 110 comprises radio frequency (RF) communication circuitry and antenna elements. The RF communication circuitry typically includes transceivers, amplifiers, filters, modulators, delay elements, and signal processing circuitry. Wireless communication device 110 may also include user interface systems, memory devices, computer-readable storage mediums, software, processing circuitry, or some other communication components. Wireless communication device 110 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be shown.

Wireless access system 120 comprises RF communication and control circuitry, antenna elements, and communication routing equipment and systems. The RF communication circuitry typically includes amplifiers, filters, RF modulators, transceivers, delay elements, and signal processing circuitry. In many examples, wireless access system 120 includes equipment to provide wireless access to communication services for user devices, such as wireless communication device 110 shown in FIG. 1, as well as route communications between core network 130 and wireless communication device 110. Wireless access system 120 may include base stations of a cellular voice and data network. Wireless access system 120 may also comprise data modems, routers, servers, memory devices, software, processing circuitry, cabling, network communication interfaces, physical structural supports, or other communication apparatuses. Wireless access system 120 may also comprise wireless access nodes, base stations, base transceiver stations, base station controllers (BSC), mobile switching centers (MSC), radio node controllers (RNC), or other communication equipment and apparatuses.

Core network 130 could include further wireless access nodes, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access nodes and associated equipment for providing communication services to many user devices across a geographic region.

Wireless link 140 uses the air or space as the transport media. Wireless link 140 may use various protocols, such as Code Division Multiple Access (CDMA), Evolution-Data Optimized (EVDO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although one main wireless link 140 is shown in FIG. 1, it should be understood that wireless link 140 is merely illustrative to show a communication mode or wireless access pathway for wireless communication device 110. In other examples, further wireless links could be shown for different communication sessions and associated paging or overhead communications, as well as multipath communications.

Communication link 141 uses metal, glass, optical, air, space, or some other material as the transport media. Communication link 141 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 141 could be a direct link or may include intermediate networks, systems, or devices.

Links 140-141 may each include many different signals sharing the same associated link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless link 140 as transmitted by wireless communication device 110 is referred to an uplink or reverse link of the wireless link, while the portion as transmitted by wireless access system 120 is referred to as a downlink or forward link of the wireless link.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, the method comprising:

determining signal quality for wireless communications received over each of a first antenna element and a second antenna element; and processing the signal quality and a power status of the wireless communication device to determine a first multipath search window for the first antenna element and a second multipath search window for the second antenna element.

2. The method of claim 1, wherein the signal quality comprises a first signal strength for the wireless communications received over the first antenna element and a second signal strength for the wireless communications received over the second antenna element.

3. The method of claim 1, wherein the power status of the wireless communication device comprises a battery charge level of a battery portion of the wireless communication device.

4. The method of claim 1, wherein a multipath window budget is allotted among the first multipath search window and the second multipath search window based on at least the power status to determine the first multipath search window for the first antenna element and the second multipath search window for the second antenna element.

5. The method of claim 1, wherein a multipath window budget is allotted among the first multipath search window and the second multipath search window based on the power status and the signal quality to determine the first multipath search window for the first antenna element and the second multipath search window for the second antenna element.

6. The method of claim 1, wherein the power status indicates a battery charge level of a battery portion of the wireless communication device, and wherein if the battery charge level is between a first threshold and a second threshold, then a multipath window budget is allotted among the first multipath search window and the second multipath search window based on at least the battery charge level to determine the first multipath search window for the first antenna element and the second multipath search window for the second antenna element.

7. The method of claim 1, comprising:

wherein the power status comprises a battery charge level of a battery portion of the wireless communication device;

wherein if the battery charge level is above a first threshold then the first multipath search window and the second multipath search window are each set to a maximum search window size;

wherein if the battery charge level is below a second threshold then at least one of the first antenna element and the second antenna element is disabled; and wherein if the battery charge level is between the first threshold and the second threshold, then a multipath window budget is allotted among the first multipath search window and the second multipath search window based on at least the battery charge level.

8. The method of claim 7, wherein the battery charge level is above the first threshold when the battery portion of the wireless communication device is being charged.

9. The method of claim 1, further comprising:

processing further wireless communications received over each of the first antenna portion and the second antenna portion to determine if multipath communications related to the further wireless communications occur outside of the first multipath search window for the first antenna portion or outside of the second multipath search window for the second antenna portion; and processing the multipath communications, the signal quality, and the power status of the wireless communication device to determine a third multipath search window for the first antenna portion and a fourth multipath search window for the second antenna portion.

10. The method of claim 1, wherein the first antenna element comprises a main antenna portion and the second antenna element comprises a diversity antenna portion with low correlation to the main antenna portion.

11. A wireless communication device, comprising:

a first antenna element and a second antenna element each configured to receive wireless communications; and a processing system configured to determine signal quality for the wireless communications received over each of the first antenna element and the second antenna element, and process the signal quality and a power status of the wireless communication device to determine a first multipath search window for the first antenna element and a second multipath search window for the second antenna element.

12. The wireless communication device of claim 11, wherein the signal quality comprises a first signal strength for the wireless communications received over the first antenna element and a second signal strength for the wireless communications received over the second antenna element.

13. The wireless communication device of claim 11, further comprising:

a battery portion; and wherein the power status of the wireless communication device comprises a battery charge level of the battery portion of the wireless communication device.

14. The wireless communication device of claim 11, wherein the processing system is configured to allot a multipath window budget among the first multipath search window and the second multipath search window based on at least the power status to determine the first multipath search window for the first antenna element and the second multipath search window for the second antenna element.

15. The wireless communication device of claim 11, wherein the processing system is configured to allot a multipath window budget among the first multipath search window and the second multipath search window based on the power status and the signal quality to determine the first multipath search window for the first antenna element and the second multipath search window for the second antenna element.

16. The wireless communication device of claim 11, further comprising:

a battery portion;

wherein the power status indicates a battery charge level of the battery portion of the wireless communication device; and wherein if the battery charge level is between a first threshold and a second threshold, then the processing system is configured to allot a multipath window budget among the first multipath search window and the second multipath search window based on at least the battery charge level to determine the first multipath search window for the first antenna element and the second multipath search window for the second antenna element.

17. The wireless communication device of claim 11, further comprising:

a battery portion;

wherein the power status comprises a battery charge level of the battery portion of the wireless communication device;

wherein if the battery charge level is above a first threshold then the processing system is configured to set both the first multipath search window and the second multipath search window to a maximum search window size;

wherein if the battery charge level is below a second threshold then the processing system is configured to disable at least one of the first antenna element and the second antenna element; and wherein if the battery charge level is between the first threshold and the second threshold, then the processing system is configured to allot a multipath window budget among the first multipath search window and the second multipath search window based on at least the battery charge level.

18. The wireless communication device of claim 17, wherein the battery charge level is above the first threshold when the battery portion of the wireless communication device is being charged.

19. The wireless communication device of claim 11, comprising:

the processing system configured to process further wireless communications received over each of the first antenna portion and the second antenna portion to determine if multipath communications related to the further wireless communications occur outside of the first multipath search window for the first antenna portion or outside of the second multipath search window for the second antenna portion; and the processing system configured to process the multipath communications, the signal quality, and the power status of the wireless communication device to determine a third multipath search window for the first antenna portion and a fourth multipath search window for the second antenna portion.

20. The wireless communication device of claim 11, wherein the first antenna element comprises a main antenna portion and the second antenna element comprises a diversity antenna portion with low correlation to the main antenna portion.

* * * * *